UNITED STATES PATENT OFFICE.

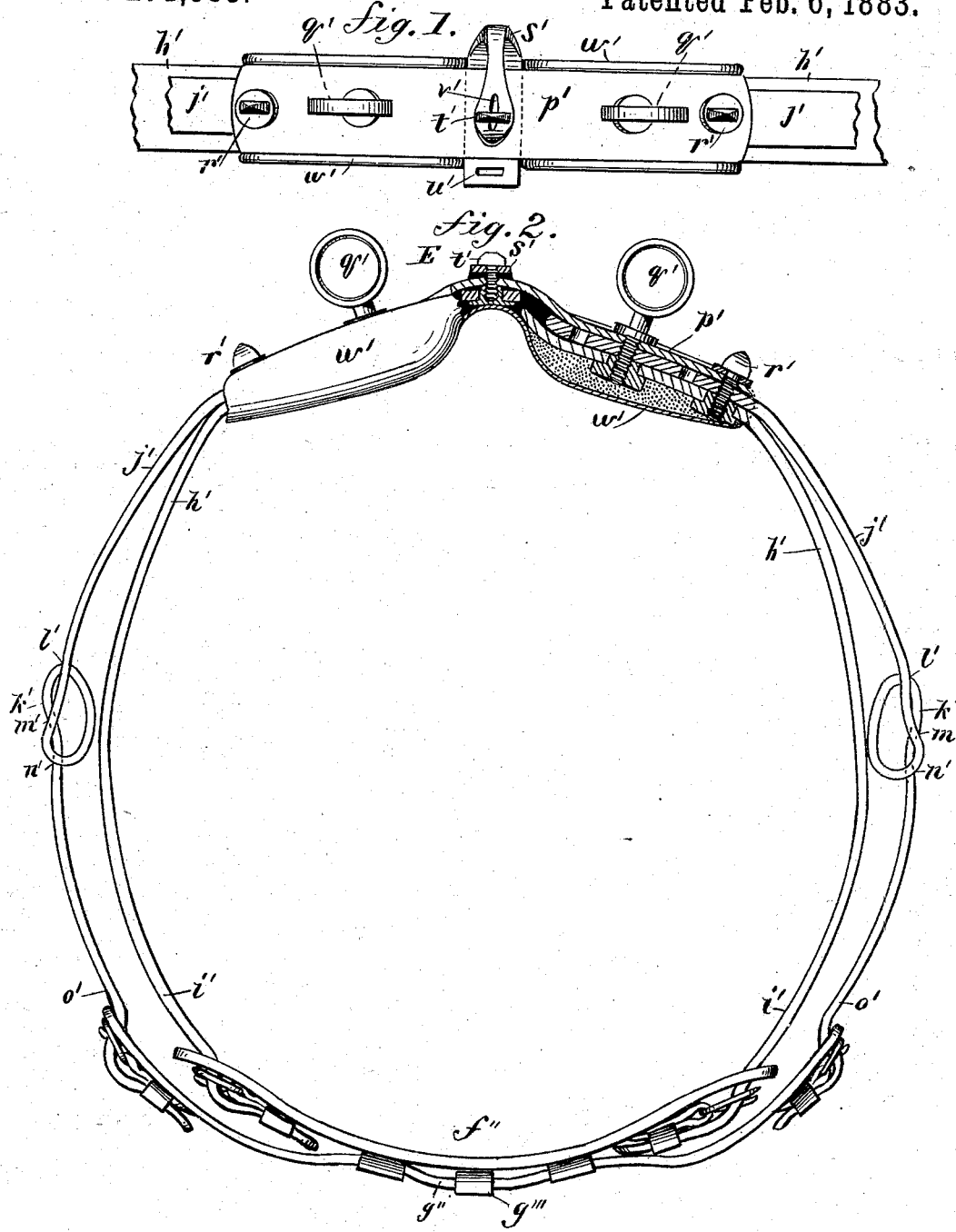

VICTOR SMITH, OF BEDFORD, PENNSYLVANIA, ASSIGNOR OF ONE-HALF TO HUMPHREY D. TATE, OF SAME PLACE.

HARNESS.

SPECIFICATION forming part of Letters Patent No. 271,933, dated February 6, 1883.

Application filed July 12, 1882. (No model.)

*To all whom it may concern:*

Be it known that I, VICTOR SMITH, of Bedford, Pennsylvania, have invented an Improvement in Harness, of which the following is a specification.

The special object of the invention is to improve the construction of a harness-saddle, together with its shaft tug and loop, as hereinafter described.

Figure 1 of the drawings is a plan view, showing the top of the saddle. Fig. 2 is a sectional elevation, showing its construction and its connection with the shaft tug and loop.

In the drawings, E represents a harness-saddle, having pad-skirts $h'$, each in one piece, and made narrow at the lower ends to form billets $i'$.

$j'$ are the shaft-tugs arranged on the upper sides of the pad-skirts, and formed with shaft-loops $k'$ and apertures $l'$ $m'$ $n'$. The shaft-tug $j'$ is narrowed below aperture $n'$, so as to form billets $o'$, and is passed back through apertures $l'$ $m'$ $n'$ to form loop $k'$. The shaft tug, loop, and billet $o'$ are all formed in one piece. The billets $i'$ $o'$ are adjustably connected in the usual manner with the belly-bands $f''$ $g''$, as shown in Fig. 2 of the drawings.

$p'$ represents a layer over the upper ends of the pad-skirts and shaft-tugs $h'$ $j'$, secured by terrets $q'$ and thumb-bolts $r'$, with the usual nuts on the under side of the pad-skirts.

$s'$ is the check-hook, passing under the layer $p'$, having the front aperture, $v'$, and rear aperture, $w'$. The forward end of this check is carried over aperture $v'$ and fastening thumb-bolt $t'$ to form a loop for the reception of the overdraw or check rein.

Beneath the terrets $q'$ and thumb-bolts $r'$ is arranged the stuffed pad $w'$, which protects the horse's back from the terret-nuts and thumb-bolts.

What I claim as new and of my invention is—

1. A harness-saddle having pad-skirts $h'$ $h'$ on opposite sides of the saddle and narrowed at the lower ends to form billets $i'$ $i'$, connected by the belly-band $f''$, as shown and described.

2. The combination, with the saddle, of shaft-tugs $j'$ $j'$, arranged on the upper sides of the pad-skirts and provided with loops $k'$, apertures $l'$ $m'$ $n'$, and billets $o'$ $o'$, the latter connected by belly-band $g''$, as shown and described.

3. The combination, with the pad-skirts $h'$ and shaft-tugs $j'$, of the check-hook $s'$, having the front and rear apertures, $v'$ $w'$, and the layer $p'$, secured by terret bolts and nuts, as shown and described.

4. The check-hook $s'$, having aperture $v'$, in combination with the thumb-bolt $t'$ and saddle E, as described.

VICTOR SMITH.

Witnesses:
JOHN W. ROUSE,
E. HOWARD BLACKBUN.